(12) United States Patent
Liberman et al.

(10) Patent No.: US 11,795,067 B2
(45) Date of Patent: Oct. 24, 2023

(54) ENVIRONMENTALLY FRIENDLY WATER INTAKE AND PRETREATMENT SYSTEM

(71) Applicant: IDE WATER TECHNOLOGIES LTD., Kadima (IL)

(72) Inventors: Boris Liberman, Kadima (IL); Miriam Faigon, Kadima (IL); Vitaly Levitin, Kadima (IL); Gal Greenberg, Kadima (IL)

(73) Assignee: IDE WATER TECHNOLOGIES LTD., Kadima (IL)

( * ) Notice: Subject to any disclaimer, the term of this patent is extended or adjusted under 35 U.S.C. 154(b) by 0 days.

(21) Appl. No.: 17/902,922

(22) Filed: Sep. 5, 2022

(65) Prior Publication Data
US 2023/0069293 A1  Mar. 2, 2023

Related U.S. Application Data

(62) Division of application No. 16/307,933, filed as application No. PCT/IB2017/053203 on May 31, 2017, now Pat. No. 11,584,661.

(30) Foreign Application Priority Data

Jun. 7, 2016  (GB) ........................... 1609911

(51) Int. Cl.
*C02F 1/00* (2023.01)
*B01D 24/12* (2006.01)
(Continued)

(52) U.S. Cl.
CPC .............. *C02F 1/004* (2013.01); *A01K 61/70* (2017.01); *A01K 79/02* (2013.01); *B01D 24/12* (2013.01);
(Continued)

(58) Field of Classification Search
None
See application file for complete search history.

(56) References Cited

U.S. PATENT DOCUMENTS 93,339 A * 8/1869 Parrot ..................... C02F 1/001
                                                    210/317
154,158 A * 8/1874 Spooner ................. B01D 35/05
                                                    210/242.1
(Continued)

FOREIGN PATENT DOCUMENTS

AU   2017279000 B2 *  3/2020  ............. A01K 61/00
GB   2551317 A    * 12/2017  ............. A01K 61/00
(Continued)

OTHER PUBLICATIONS

Combined Search and examination report dated Jul. 29, 2016 for UK patent application GB1609911.1.
(Continued)

*Primary Examiner* — Robert J Popovics
(74) *Attorney, Agent, or Firm* — FRESH IP PLC; Clifford D. Hyra; Aubrey Y. Chen

(57) ABSTRACT

A water intake and pretreatment system (10) comprising an inlet for delivering water from a natural source to a reservoir (12); said inlet to reservoir having a net screen (16) to prevent entry of organisms above a predetermined size and including a one-way gate (30) to allow organisms to exit the reservoir; said reservoir further comprising a granular filter media for water and algae filtration; and a drainage layer for removal of filtered water from the granular filter media to a drainage outlet. A local backwashing apparatus (40) is included for localized backwashing of the granular filter media.

3 Claims, 6 Drawing Sheets

(51) Int. Cl.
   *B01D 24/46* (2006.01)
   *A01K 79/02* (2006.01)
   *E02B 1/00* (2006.01)
   *A01K 61/70* (2017.01)
   *E03B 3/04* (2006.01)
   *C02F 103/08* (2006.01)

(52) U.S. Cl.
   CPC ..... *B01D 24/4631* (2013.01); *B01D 24/4636* (2013.01); *C02F 1/001* (2013.01); *E02B 1/006* (2013.01); *E03B 3/04* (2013.01); *C02F 2103/08* (2013.01); *C02F 2201/004* (2013.01); *C02F 2301/04* (2013.01); *C02F 2303/16* (2013.01); *C02F 2303/24* (2013.01); *Y02A 40/81* (2018.01)

(56) References Cited

U.S. PATENT DOCUMENTS

| | | | | |
|---|---|---|---|---|
| 164,510 A * | 6/1875 | Ball | A01K 63/04 | 210/170.1 |
| 167,546 A * | 9/1875 | Lefferts | C02F 3/327 | 210/252 |
| 180,087 A * | 7/1876 | Cole | E02B 9/04 | 405/127 |
| 183,751 A * | 10/1876 | Compton | B01D 17/0214 | 119/80 |
| 207,015 A * | 8/1878 | Compton | B01D 17/0214 | 166/228 |
| 246,655 A * | 9/1881 | Bramhall | E02B 9/04 | 405/127 |
| 300,576 A * | 6/1884 | Cole | E02B 9/04 | 405/127 |
| 304,318 A * | 9/1884 | Hean | B01D 29/111 | 285/405 |
| 332,660 A * | 12/1885 | Johnson | B01D 17/0208 | 210/123 |
| 342,652 A * | 5/1886 | Thacher et al. | B01D 24/4631 | 210/275 |
| 344,813 A * | 7/1886 | Bull et al. | E02B 9/04 | 210/284 |
| 345,773 A * | 7/1886 | Crane | A01K 63/04 | 210/170.09 |
| 407,036 A * | 7/1889 | Rigby | C02F 3/20 | 210/260 |
| 426,988 A * | 4/1890 | Crocker | C02F 1/5281 | 210/301 |
| 485,983 A * | 11/1892 | Powell | E02D 29/073 | 210/156 |
| 553,424 A * | 1/1896 | Ricks | B01D 35/153 | 210/279 |
| 599,971 A * | 3/1898 | Millstine | A01K 63/04 | 405/43 |
| 616,364 A * | 12/1898 | Shreeve | C02F 1/42 | 210/418 |
| 623,782 A * | 4/1899 | Hammett | C02F 3/20 | 210/220 |
| 671,685 A * | 4/1901 | Xander | B01D 24/005 | 210/264 |
| 679,536 A * | 7/1901 | McCann | A01K 63/04 | 210/150 |
| 699,032 A * | 4/1902 | Smith | E02B 3/023 | 210/291 |
| 719,240 A * | 1/1903 | Lydon | A01K 63/04 | 405/52 |
| 763,325 A * | 6/1904 | Roche | B01D 35/05 | 137/578 |
| 779,703 A * | 1/1905 | Gardner | A01K 63/04 | 210/299 |
| 785,125 A * | 3/1905 | Shafer | B01D 21/245 | D23/209 |
| 802,183 A * | 10/1905 | Durbrow | A01K 63/04 | 405/60 |
| 857,519 A * | 6/1907 | Foster | F16L 55/24 | 285/283 |
| 869,558 A * | 10/1907 | Durbrow | B01D 24/04 | 210/283 |
| 904,389 A * | 11/1908 | White | C02F 3/327 | 210/248 |
| 922,101 A * | 5/1909 | Diescher | B01D 29/035 | 210/162 |
| 975,450 A * | 11/1910 | Ouimet | A01K 63/04 | 210/170.09 |
| 1,063,344 A * | 6/1913 | Fleishman | F03B 11/08 | 210/160 |
| 1,078,658 A * | 11/1913 | Barber | E02B 9/04 | 405/127 |
| 1,099,085 A * | 6/1914 | Hale | F03B 13/264 | 415/198.1 |
| 1,109,385 A * | 9/1914 | Allison | E03F 5/14 | 210/155 |
| 1,150,445 A * | 8/1915 | Matheson | E03F 5/14 | 210/162 |
| 1,182,446 A * | 5/1916 | Barber | E02D 19/04 | 405/127 |
| 1,262,007 A * | 4/1918 | Bludworth | E02B 1/006 | 210/156 |
| 1,266,331 A * | 5/1918 | Schwinger | B01D 33/073 | 210/157 |
| 1,269,779 A * | 6/1918 | Bell | E03F 5/14 | 210/155 |
| 1,315,615 A * | 9/1919 | Wahlman | E02B 9/04 | 405/127 |
| 1,380,384 A * | 6/1921 | Howard | E02B 8/085 | 405/83 |
| 1,397,452 A * | 11/1921 | Reed | B01D 24/4631 | 210/268 |
| 1,451,394 A * | 4/1923 | Hurst | E02B 1/006 | 210/162 |
| 1,456,759 A * | 5/1923 | Booth | 210/460 | |
| 1,486,033 A * | 3/1924 | Rhudy | B25H 1/0064 | 408/124 |
| 1,513,878 A * | 11/1924 | Anthony | B01D 33/06 | 210/160 |
| 1,516,693 A * | 11/1924 | Anthony | B01D 35/05 | 210/385 |
| 1,585,409 A * | 5/1926 | Myers | E02B 13/00 | 210/170.1 |
| 1,810,981 A * | 6/1931 | Noble | B01D 29/11 | 405/127 |
| 1,825,169 A * | 9/1931 | Wyckoff | E02B 5/085 | 405/81 |
| 1,995,367 A * | 3/1935 | Stewart | E02B 7/16 | 210/252 |
| 2,095,504 A * | 10/1937 | Kesti | A01K 69/00 | 210/160 |
| 2,121,968 A * | 6/1938 | Kuehl | E02B 8/085 | 405/83 |
| 2,152,619 A * | 3/1939 | Maher | E03B 3/04 | 210/488 |
| 2,223,104 A * | 11/1940 | Hansen | B01D 33/801 | 210/354 |
| 2,233,218 A * | 2/1941 | Moore | C02F 1/5281 | 210/194 |
| 2,294,179 A * | 8/1942 | Degenhardt | B01D 33/073 | 210/396 |
| 2,361,231 A * | 10/1944 | Nebolsine | F04D 29/708 | 137/550 |
| 2,552,493 A * | 5/1951 | Newton | E03B 11/00 | 210/411 |
| 2,653,129 A * | 9/1953 | Nebolsine | E03B 3/04 | 137/263 |
| 2,826,897 A * | 3/1958 | Vinsonhaler | E02B 1/003 | 119/219 |
| 2,837,211 A * | 6/1958 | Everson | E02B 8/023 | 210/154 |
| 2,901,113 A * | 8/1959 | Newell | B03B 5/56 | 210/161 |

(56) References Cited

U.S. PATENT DOCUMENTS

| | | | | |
|---|---|---|---|---|
| 3,151,068 A * | 9/1964 | Poisel | E02B 5/085 | 210/538 |
| 3,241,676 A * | 3/1966 | Caple | D21F 1/66 | 210/791 |
| 3,377,805 A * | 4/1968 | Warner | E02B 8/085 | 405/104 |
| 3,483,983 A * | 12/1969 | Lindstrom | B01D 24/24 | 210/264 |
| 3,596,768 A * | 8/1971 | Whitten, Jr. | C02F 1/001 | 210/167.31 |
| 3,820,342 A * | 6/1974 | Bottorf | E02B 8/085 | 405/83 |
| 3,832,854 A * | 9/1974 | Metts | G05D 9/02 | 137/577 |
| 3,843,520 A * | 10/1974 | Bottorf | B01D 35/05 | 210/393 |
| 3,868,324 A * | 2/1975 | Taylor | B01D 33/333 | 210/333.1 |
| 3,927,534 A * | 12/1975 | Larson | E02B 1/006 | 405/127 |
| 3,938,340 A * | 2/1976 | Downs | E02B 8/085 | 405/83 |
| 3,957,006 A * | 5/1976 | Lapeyre | B63B 35/00 | 114/65 R |
| 3,996,138 A * | 12/1976 | Daidola | E02B 1/006 | 210/170.11 |
| 4,064,048 A * | 12/1977 | Downs | A01K 79/02 | 210/160 |
| 4,169,792 A * | 10/1979 | Dovel | B01D 33/50 | 210/411 |
| 4,192,749 A * | 3/1980 | Jackson | B01D 33/073 | 210/161 |
| 4,210,539 A * | 7/1980 | Shiban | B01D 33/073 | 210/402 |
| 4,260,286 A * | 4/1981 | Buchanan | A01K 61/10 | 405/81 |
| 4,261,822 A * | 4/1981 | Richardson | B01D 33/801 | 210/161 |
| 4,335,977 A * | 6/1982 | Ihli | E03B 11/00 | 210/170.03 |
| 4,360,427 A * | 11/1982 | Posgate | B01D 21/0018 | 405/74 |
| 4,382,423 A * | 5/1983 | Dugan | A01K 73/12 | 119/211 |
| 4,415,462 A * | 11/1983 | Finch | E02B 5/08 | 210/162 |
| 4,481,904 A * | 11/1984 | Fletcher | E02B 1/006 | 119/219 |
| 4,486,307 A * | 12/1984 | Weiler | B01D 24/4636 | 210/275 |
| 4,495,891 A * | 1/1985 | Dugan | A01K 73/12 | 119/211 |
| 4,526,494 A * | 7/1985 | Eicher | E02B 1/006 | 210/162 |
| 4,565,627 A * | 1/1986 | Lagstrom | E02B 9/08 | 210/256 |
| 4,594,024 A * | 6/1986 | Jenkner | E02B 9/04 | 405/80 |
| 4,676,893 A * | 6/1987 | Travade | E02B 8/085 | 210/330 |
| 4,740,105 A * | 4/1988 | Wollander | E02B 8/085 | 405/83 |
| 4,789,486 A * | 12/1988 | Ritter | B01D 24/20 | 210/170.11 |
| 4,879,026 A * | 11/1989 | Metais | E02B 15/106 | 210/123 |
| 4,911,835 A * | 3/1990 | Ishii | C22B 3/42 | 210/242.1 |
| 5,052,855 A * | 10/1991 | Chapman | A01G 25/00 | 405/36 |
| 5,094,751 A * | 3/1992 | Ramsey | B01D 29/114 | 210/411 |
| 5,116,490 A * | 5/1992 | Fontenot | B01D 33/50 | 210/158 |
| 5,152,637 A * | 10/1992 | Wayne | A01K 79/02 | 119/234 |
| 5,161,913 A * | 11/1992 | Boylan | E02B 8/085 | 405/83 |
| 5,256,310 A * | 10/1993 | Brooks | C02F 1/686 | 210/764 |
| 5,385,428 A * | 1/1995 | Taft, 3rd | E02B 1/006 | 405/127 |
| 5,393,418 A * | 2/1995 | Jackson | F04D 29/605 | 210/162 |
| 5,558,462 A * | 9/1996 | O'Haver | A01K 79/02 | 210/242.1 |
| 5,611,677 A * | 3/1997 | Salama | E02B 13/00 | 416/189 |
| 5,653,874 A * | 8/1997 | Berry, III | E02B 1/006 | 210/162 |
| 5,851,087 A * | 12/1998 | Berry, III | B01D 29/15 | 210/161 |
| 6,051,131 A * | 4/2000 | Maxson | B01D 29/48 | 210/162 |
| 6,076,994 A * | 6/2000 | Brockway | E03B 3/04 | 210/170.11 |
| 6,089,790 A * | 7/2000 | Berry, III | E03B 3/04 | 138/41 |
| 6,095,719 A * | 8/2000 | Miya | E03B 3/14 | 405/80 |
| 6,270,669 B1 * | 8/2001 | Bauer | B01D 35/05 | 210/402 |
| 6,270,684 B1 * | 8/2001 | Schloss | B01D 33/461 | 210/791 |
| 6,273,639 B1 * | 8/2001 | Eikrem | E02B 8/085 | 405/83 |
| 6,343,433 B1 * | 2/2002 | Granberg | A01K 79/00 | 43/6.5 |
| 6,354,763 B1 * | 3/2002 | Ishikawa | E03B 3/04 | 405/303 |
| 6,451,204 B1 * | 9/2002 | Anderson | E02B 5/085 | 210/162 |
| 6,461,502 B1 * | 10/2002 | Nobukawa | C02F 1/28 | 210/170.11 |
| 6,524,028 B2 * | 2/2003 | Bryan | A01K 61/00 | 405/83 |
| 6,575,662 B2 * | 6/2003 | French | C02F 1/008 | 405/80 |
| 6,660,170 B2 * | 12/2003 | Dreyer | E03B 3/04 | 210/931 |
| 6,679,994 B1 * | 1/2004 | Turco | E03F 5/12 | 210/791 |
| 6,682,651 B1 * | 1/2004 | Toland | B01D 29/15 | 210/162 |
| 6,712,959 B2 * | 3/2004 | Ekholm | E02B 5/08 | 210/162 |
| 6,726,404 B2 * | 4/2004 | Nestler | E02B 1/006 | 405/80 |
| 6,793,440 B2 * | 9/2004 | Nestler | E02B 8/085 | 405/80 |
| 6,843,924 B2 * | 1/2005 | Dreyer | E03B 3/04 | 210/931 |
| 6,964,541 B2 * | 11/2005 | Bryan | A01K 61/00 | 405/83 |
| 7,241,384 B1 * | 7/2007 | Torres-Collazo | B01D 35/05 | 210/232 |
| 7,267,763 B2 * | 9/2007 | Jackson | B01D 29/41 | 210/162 |
| 7,344,644 B2 * | 3/2008 | Haudenschild | B09C 1/002 | 210/291 |
| 7,347,933 B2 * | 3/2008 | Berry, III | B01D 33/073 | 210/791 |
| 7,473,373 B1 * | 1/2009 | Danler | E03F 1/00 | 210/170.03 |
| 7,488,426 B1 * | 2/2009 | Zaiter | B01D 29/54 | 210/345 |
| 7,648,630 B2 * | 1/2010 | Broussard | C02F 1/001 | 210/275 |

(56) References Cited

U.S. PATENT DOCUMENTS

| | | | | |
|---|---|---|---|---|
| 7,670,482 B2* | 3/2010 | Wietham | | F04D 29/708 210/402 |
| 7,708,494 B2* | 5/2010 | McLaughlin | | E02B 1/006 405/80 |
| 7,862,713 B2* | 1/2011 | Justice | | E03B 3/12 210/291 |
| 7,867,395 B2* | 1/2011 | Ekholm | | B01D 35/02 210/411 |
| 7,938,957 B2* | 5/2011 | Bolan | | E03B 3/04 210/162 |
| 7,950,527 B2* | 5/2011 | Osborne | | B01D 35/02 210/172.3 |
| 8,075,700 B2* | 12/2011 | Ekholm | | B08B 9/00 134/22.12 |
| 8,123,957 B2* | 2/2012 | Bolan | | B01D 35/05 210/747.6 |
| 8,252,175 B2* | 8/2012 | Weir | | E02B 8/026 210/220 |
| 8,282,836 B2* | 10/2012 | Feher | | E02B 9/04 210/162 |
| 8,292,089 B2* | 10/2012 | Osborne | | B01D 35/02 210/172.3 |
| 8,297,448 B2* | 10/2012 | Watson | | E02B 5/08 210/172.3 |
| 8,505,154 B2* | 8/2013 | Schuler | | B01D 35/02 15/301 |
| 8,652,324 B2* | 2/2014 | Wietharn | | B01D 33/801 210/402 |
| 8,771,509 B2* | 7/2014 | Huang | | C02F 11/00 210/324 |
| 9,023,198 B2* | 5/2015 | Wietharn | | B01D 35/05 210/402 |
| 9,108,127 B2* | 8/2015 | Schuler | | B01D 29/46 |
| 9,272,170 B2* | 3/2016 | Hubbell, Jr. | | A62C 29/00 |
| 9,273,439 B1* | 3/2016 | Perkins | | E02B 5/085 |
| 9,345,993 B2* | 5/2016 | Niizato | | B01D 24/4626 |
| 9,399,858 B2* | 7/2016 | Maxson | | B01D 39/10 |
| 9,403,108 B2* | 8/2016 | Broussard | | B01D 29/68 |
| 9,604,164 B2* | 3/2017 | Smith | | B01D 29/48 |
| 9,730,431 B2* | 8/2017 | French | | A01K 61/90 |
| 9,889,395 B2* | 2/2018 | Reber | | F04F 5/10 |
| 9,943,786 B2* | 4/2018 | Ekholm | | B01D 35/18 |
| 9,962,740 B2* | 5/2018 | Thaler | | B08B 1/008 |
| 9,968,872 B2* | 5/2018 | Carayon | | B01D 33/073 |
| 10,124,279 B2* | 11/2018 | Schuler | | B01D 29/46 |
| 10,155,678 B2* | 12/2018 | Murtha, Jr. | | F03B 13/14 |
| 10,214,871 B2* | 2/2019 | Ekholm | | B01D 35/1576 |
| 10,227,745 B2* | 3/2019 | Sifuentes Sanchez | | E02B 8/02 |
| 10,272,366 B2* | 4/2019 | Inui | | B01D 29/66 |
| 10,272,367 B2* | 4/2019 | Inui | | B01D 24/12 |
| 10,316,505 B2* | 6/2019 | Cole | | E02B 8/04 |
| 10,370,261 B2* | 8/2019 | Sanford | | C02F 1/004 |
| 10,391,429 B2* | 8/2019 | Carayon | | B01D 33/503 |
| 10,399,013 B2* | 9/2019 | Maxson | | B01D 39/10 |
| 10,456,720 B2* | 10/2019 | Smith | | B01D 29/33 |
| 10,526,224 B2* | 1/2020 | Wallace | | C02F 9/00 |
| 10,549,224 B2* | 2/2020 | Carayon | | B01D 33/503 |
| 10,563,368 B2* | 2/2020 | Ley, III | | E03B 3/04 |
| 10,702,804 B2* | 7/2020 | Liberman | | B01D 24/4636 |
| 10,760,233 B2* | 9/2020 | French, Sr. | | E02B 3/10 |
| 10,766,793 B2* | 9/2020 | Murtha, Jr. | | C02F 1/441 |
| 10,781,565 B2* | 9/2020 | Deng | | E02B 8/023 |
| 10,801,189 B2* | 10/2020 | Watson | | E02B 5/08 |
| 10,807,023 B2* | 10/2020 | Larsson | | B01D 24/46 |
| 10,926,201 B2* | 2/2021 | Liberman | | B01D 24/4689 |
| 10,967,311 B1* | 4/2021 | Unruh | | B01D 35/05 |
| 11,192,068 B2* | 12/2021 | Ekholm | | B01D 29/661 |
| 11,203,854 B1* | 12/2021 | Eggleton | | E02B 9/04 |
| 11,319,221 B2* | 5/2022 | Jennings | | F03B 13/08 |
| 11,331,603 B2* | 5/2022 | Maxson | | E02B 5/08 |
| 11,428,219 B2* | 8/2022 | Hofer | | F04B 53/20 |
| 11,565,199 B2* | 1/2023 | Liberman | | B01D 24/4626 |
| 11,584,661 B2* | 2/2023 | Liberman | | A01K 79/02 |
| 2002/0044835 A1* | 4/2002 | Esposito | | E03B 3/04 405/80 |
| 2002/0127060 A1* | 9/2002 | Bryan | | E02B 9/04 119/219 |
| 2003/0029780 A1* | 2/2003 | Ekholm | | B01D 29/114 210/162 |
| 2003/0085166 A1* | 5/2003 | Dreyer | | E03B 3/04 210/220 |
| 2003/0198516 A1* | 10/2003 | Bryan | | E02B 1/006 405/81 |
| 2004/0112839 A1* | 6/2004 | Dreyer | | E03B 3/04 210/931 |
| 2005/0279680 A1* | 12/2005 | Jackson | | B01D 33/21 210/161 |
| 2007/0017549 A1* | 1/2007 | Ekholm | | B01D 35/02 134/109 |
| 2007/0108112 A1* | 5/2007 | Jones | | E03B 3/00 210/170.11 |
| 2007/0175834 A1* | 8/2007 | Osborne | | B01D 29/114 210/162 |
| 2007/0227956 A1* | 10/2007 | Wietham | | B01D 33/50 210/403 |
| 2008/0000527 A1* | 1/2008 | Ranstead | | E03B 3/04 137/398 |
| 2008/0011689 A1* | 1/2008 | Gordon | | B01D 61/12 210/170.11 |
| 2008/0101867 A1* | 5/2008 | McLaughlin | | E02B 1/006 405/83 |
| 2009/0173691 A1* | 7/2009 | Oklejas, Jr. | | C02F 1/441 210/97 |
| 2009/0184064 A1* | 7/2009 | Zaiter | | B01D 29/114 210/170.01 |
| 2009/0230042 A1* | 9/2009 | Broussard | | C02F 1/004 210/275 |
| 2010/0065508 A1* | 3/2010 | Bolan | | E03B 7/00 210/162 |
| 2010/0243547 A1* | 9/2010 | Justice | | E03B 3/32 210/170.09 |
| 2011/0056526 A1* | 3/2011 | Ekholm | | B01D 29/46 134/37 |
| 2011/0146802 A1* | 6/2011 | Feher | | E02B 5/08 137/544 |
| 2011/0174703 A1* | 7/2011 | Bolan | | B01D 35/05 210/136 |
| 2011/0204003 A1* | 8/2011 | Kaczor | | A01K 63/10 210/800 |
| 2011/0233132 A1* | 9/2011 | Wietharn | | B01D 33/801 210/403 |
| 2011/0278235 A1* | 11/2011 | Blumenthal | | E03B 3/04 210/170.11 |
| 2011/0290743 A1* | 12/2011 | Osborne | | B01D 29/114 210/335 |
| 2011/0297595 A1 | 12/2011 | Wallace | | |
| 2012/0020734 A1* | 1/2012 | Ross | | E03B 3/04 405/80 |
| 2012/0125828 A1* | 5/2012 | Watson | | E02B 5/08 210/162 |
| 2012/0125829 A1* | 5/2012 | Wallace | | E02B 9/04 210/170.11 |
| 2012/0138164 A1* | 6/2012 | Bolan | | B01D 35/05 137/154 |
| 2012/0152855 A1 | 6/2012 | Lean et al. | | |
| 2012/0248018 A1* | 10/2012 | Hopf | | B01D 29/6423 210/159 |
| 2012/0261357 A1* | 10/2012 | Larsson | | B01D 24/007 210/269 |
| 2012/0298572 A1* | 11/2012 | Ekholm | | B01D 35/1576 210/340 |
| 2013/0001148 A1* | 1/2013 | Osborne | | E02B 9/04 210/323.1 |
| 2013/0043172 A1* | 2/2013 | Watson | | E02B 5/08 210/162 |
| 2013/0048551 A1* | 2/2013 | Maxson | | B01D 35/02 210/323.2 |
| 2013/0061421 A1* | 3/2013 | Schuler | | B01D 29/114 137/544 |

(56) References Cited

U.S. PATENT DOCUMENTS

| | | | |
|---|---|---|---|
| 2013/0180904 A1* | 7/2013 | Broussard | C02F 1/004 210/232 |
| 2013/0206184 A1* | 8/2013 | Nair | B08B 3/024 134/172 |
| 2013/0206706 A1* | 8/2013 | Ekholm | E02B 9/04 210/97 |
| 2014/0083724 A1* | 3/2014 | Hubbell, Jr. | A62C 3/02 169/52 |
| 2014/0138300 A1* | 5/2014 | Wietharn | B01D 33/073 210/242.1 |
| 2014/0224746 A1* | 8/2014 | Niizato | C02F 1/441 210/170.11 |
| 2014/0238924 A1* | 8/2014 | Niizato | B01D 24/4626 210/273 |
| 2014/0246388 A1* | 9/2014 | Larsson | B01D 24/46 210/252 |
| 2015/0001166 A1* | 1/2015 | Ben-Horin | B01D 29/6438 210/791 |
| 2015/0014242 A1* | 1/2015 | Smith | B23K 31/02 228/178 |
| 2015/0021249 A1* | 1/2015 | Watson | E02B 5/08 210/153 |
| 2015/0034569 A1* | 2/2015 | Liberman | B01D 24/4636 210/138 |
| 2015/0258474 A1* | 9/2015 | Broussard | B01D 35/05 210/257.1 |
| 2015/0265952 A1* | 9/2015 | Berry, IV | B01D 33/461 210/396 |
| 2015/0285209 A1* | 10/2015 | Sepp | F03B 13/08 290/54 |
| 2015/0306527 A1* | 10/2015 | Schuler | B01D 29/46 210/190 |
| 2016/0114265 A1* | 4/2016 | Liberman | B01D 24/4689 210/275 |
| 2016/0199783 A1* | 7/2016 | Meano, Sr. | B01D 61/10 210/170.05 |
| 2017/0106313 A1* | 4/2017 | Maxson | B01D 39/10 |
| 2017/0120253 A1* | 5/2017 | Sanford | C02F 1/006 |
| 2017/0129788 A1* | 5/2017 | Murtha, Jr. | B63B 35/44 |
| 2017/0189830 A1* | 7/2017 | Cody | C02F 1/14 |
| 2017/0197161 A1* | 7/2017 | Smith | B01D 29/48 |
| 2017/0247849 A1* | 8/2017 | Ley, III | E02B 3/02 |
| 2018/0050283 A1* | 2/2018 | Inui | B01D 24/4631 |
| 2018/0056213 A1* | 3/2018 | Inui | B01D 24/12 |
| 2018/0298576 A1* | 10/2018 | Sifuentes Sanchez | E03B 3/04 |
| 2018/0371738 A1* | 12/2018 | Cole | E02B 8/04 |
| 2019/0077682 A1* | 3/2019 | Murtha, Jr. | B63B 35/44 |
| 2019/0083907 A1* | 3/2019 | Liberman | B01D 24/4636 |
| 2019/0118119 A1* | 4/2019 | Liberman | C02F 1/004 |
| 2019/0138034 A1* | 5/2019 | Holt | E02B 8/045 |
| 2019/0263677 A1* | 8/2019 | Liberman | B01D 24/12 |
| 2019/0336894 A1* | 11/2019 | Heil | B01D 33/333 |
| 2019/0368148 A1* | 12/2019 | Deng | E03B 1/02 |
| 2019/0390428 A1* | 12/2019 | Ekholm | E02B 9/04 |
| 2020/0054970 A1* | 2/2020 | Liberman | B01D 24/46 |
| 2020/0122062 A1* | 4/2020 | Maxson | B01D 29/111 |
| 2020/0299154 A1* | 9/2020 | Jennings | F03B 13/08 |
| 2020/0325894 A1* | 10/2020 | Hofer | F04B 53/103 |
| 2020/0398226 A1* | 12/2020 | Ekholm | E03B 3/04 |
| 2021/0002146 A1* | 1/2021 | Liberman | C02F 1/004 |
| 2021/0031125 A1* | 2/2021 | Liberman | B01D 24/4636 |
| 2021/0187416 A1* | 6/2021 | Ekholm | B01D 29/48 |
| 2021/0298275 A1* | 9/2021 | Kiuru | A01K 61/10 |
| 2021/0363958 A1* | 11/2021 | Fasseland | B01D 35/18 |
| 2022/0041482 A1* | 2/2022 | Zheng | C02F 3/327 |
| 2022/0074157 A1* | 3/2022 | Zheng | E02B 3/14 |
| 2022/0105474 A1* | 4/2022 | Ekholm | B01D 29/661 |
| 2022/0315451 A1* | 10/2022 | Liberman | C02F 1/004 |
| 2022/0333595 A1* | 10/2022 | Hofer | B01D 29/114 |
| 2023/0069293 A1* | 3/2023 | Liberman | B01D 24/4636 |
| 2023/0096195 A1* | 3/2023 | Francis | E03B 3/04 210/689 |
| 2023/0103787 A1* | 4/2023 | Ekholm | B01D 25/24 210/348 |

FOREIGN PATENT DOCUMENTS

| | | |
|---|---|---|
| KR | 20110039047 A | 4/2011 |
| KR | 101365391 B1 | 2/2014 |
| WO | WO-2017212371 A1 * | 12/2017 ............ A01K 61/00 |

OTHER PUBLICATIONS

International Search report dated Jul. 28, 2017 for application PCT/IB2017/053203.

* cited by examiner

ENVIRONMENTALLY FRIENDLY WATER INTAKE AND PRETREATMENT SYSTEM

TECHNICAL FIELD

The present invention relates to the field of water treatment, especially to an environmentally friendly seawater intake and pretreatment system and process, particularly but not exclusively for desalination plants.

BACKGROUND

Water treatment systems such as seawater desalination facilities and power plants that require an intake of cooling water from fresh sea water include an intake unit for delivering water from its source (e.g. sea) to the system, and a pretreatment unit for removing floating and dissolved material from the delivered water, in order to prepare the water for the main membrane process.

Two types of intake units are open intakes and infiltration intakes (or infiltration galleries). Open intakes draw water via piping directly from the water body. Open intakes typically employ screen meshes to filter out large debris and prevent fish or other marine life from being drawn into the system, such as the desalination system. However, millions of fish and other small marine organisms, with a width of under 2 cm, are sucked into the piping, leading to considerable damage, both to the environment and to facilities. Damage is inflicted on both large aquatic organisms such as fish or crabs that are trapped against the intake screens and drown or suffocate, and on small marine organisms such as fish, fish eggs or larvae that are drawn into the intake system and destroyed by the plant equipment.

Infiltration intakes, or galleries, are built in the seabed by the installation of horizontal drain systems. The drain system is placed in the natural filtration media sand, or cracked stone or other water permeable natural media and the seawater is slowly filtered by it. This media is naturally cleaned by waves and storms. Horizontal drain systems deliver water to the pumping station located on the seashore. Infiltration galleries, while protecting the marine environment, can only be installed in areas with naturally occurring medias. Furthermore, a huge area of sea is required and the filtration velocity is typically very slow. After a certain period of time, flow is diminished and a new area has to be selected for intake.

Ranney wells are also used to provide lateral screens for water intake. A caisson is constructed into the sand below surface level and the screened conduits extend horizontally from ports in the caisson to provide an infiltration gallery with a single central withdrawal point. However, this is only suitable for providing intake water to plants of small size.

Another example of an intake system is a filter packed slant well. These wells are drilled into the sea bed at an angle and filtered water is pumped from below the surface. However, this type of system is high cost with limited output.

Environmental Protection Agencies are requiring further improvements to intake units to minimize adverse environmental impacts, in particular reducing mortality to fish and other aquatic organisms. For example, Section 316(b) of the Clean Water Act requires that National Pollutant Discharge Elimination System (NPDES) permits for facilities with cooling water intake structures ensure that the location, design, construction, and capacity of the structures reflect the best technology available to minimize harmful impacts on the environment. The withdrawal of cooling water by facilities removes billions of aquatic organisms from waters of the United States each year, including fish, larvae and eggs, crustaceans, shellfish, sea turtles, marine mammals and other aquatic life. Most impacts occur to early life stages of fish and shellfish through impingement (organisms pinned against cooling water intake structures) and entrainment (organisms drawn into cooling water systems and affected by heat, chemicals or physical stress). It would be desirable to reduce mortality of larva that are introduced into the intake units in addition to larger aquatic organisms.

It is an object of the present invention to provide an improved seawater intake unit that aims to reduce the mortality of aquatic life, in particular larva.

If a further object of the present invention to provide an improved seawater intake that aims to encourage aquatic life, in particular larva.

BRIEF SUMMARY

One aspect of the present invention provides an environmentally friendly water intake and pretreatment system comprising an inlet for delivering water from a natural source, preferably sea water, to a reservoir; said inlet to reservoir having a net screen to prevent entry of organisms above a predetermined size and including a one-way gate to allow organisms to freely exit the reservoir; said reservoir further comprising a granular filter media for water and algae filtration; and a drainage layer below said filter media for removal of filtered water from the granular filter media to a drainage outlet.

The system preferably includes a local backwashing apparatus for localized backwashing of the granular filter media.

The net screen preferably excludes organisms above 2 cm long or wide from entering the reservoir. The one-way gate preferably allows organisms of any size to exit the reservoir or alternatively may be configured to only allow exit of organisms above a certain size to exit the reservoir.

Preferably, the water in the reservoir is a maximum depth of 2 meters, more preferably 1 meter, above the granular filter media. The granular filter media is preferably sand.

The shallow depth of the reservoir with a granular filter media bed encourages growth of algae at the surface of the filter media, promoting larvae growth in the reservoir. The reservoir acts as a larvae nursery, being protected from predators by the presence of the filter screen.

The inlet to the reservoir is preferably a gravity-feed channel from the natural water source. The natural water source is preferably sea water and the reservoir is ideally provided with a wave protection structure. Alternatively, the system should be located in an area where there are no high waves and the sea is a closed sea.

The one-way gate may comprise a rotating gate or wheel. Preferably, the gate has a rotating door or panel provided with a curtain or sheet of flexible material.

The system preferably includes a local backwashing apparatus comprising an enclosure having an open lower end positionable above a surface of the granular filter media supported above the drainage layer; a supporting structure movably supporting the enclosure, the supporting structure configured to position the enclosure at specified spots on the surface of the granular filter media, a pneumatic system in fluid communication with an upper part of the enclosure and configured to determine an air pressure in an upper part, a pipe system connecting the upper part of the enclosure with the pneumatic system and with a discharge structure, and a control unit connected to the supporting structure and pneumatic system and configured to conduct local backwashing of consecutive partial volumes of the filter media by sinking the enclosure into the filter media until the enclosure is supported on the drainage layer by reducing the air pressure in the upper part of the enclosure through the pneumatic system once the open lower end of the enclosure is immersed in filter media, to enclose the partial volume of filter media within the enclosure and generating local backwashing of the partial volume of the filter media enclosed in the enclosure by generating suction through the pneumatic system that initiates a water flow from the upper part of the enclosure through the pipe system to the discharge structure, wherein the water flow introduces into the lower end of the enclosed partial volume of filter media filtered water from the drainage layer which expands the enclosed filter media and releases sludge therefrom to the water flow that flows to the discharge structure, and raising the enclosure above the surface of the filter media to release the backwashed enclosed volume of filter media, by injecting air and increasing air pressure in the upper part of the enclosure through the pneumatic system to float the enclosure above the filter media.

The enclosure is preferably provided with a flexible skirt around the open lower end thereof to prevent organisms above a predetermined size entering the enclosure. This further serves to preserve aquatic life within the system.

The supporting structure of the enclosure may be at least one of: a fixed bridge, a floating bridge, a rotating bridge and a crane.

A height of the enclosure is preferably larger than a height of the water above the granular filter media in respect to the drainage layer.

A further aspect of the present invention provides a water intake and pretreatment process comprising the steps of delivering water from a natural source to a reservoir; preventing entry of organisms above a predetermined size into the reservoir but allowing organisms below a predetermined size to enter and exit the reservoir; filtering water in said reservoir through a granular filter media for water and algae filtration; and removing the filtered water from the granular filter media.

Preferably, the process further comprises local backwashing of partial volumes of the granular filter media. A rinsing step may also be included if desired.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

DETAILED DESCRIPTION

Figure 1:
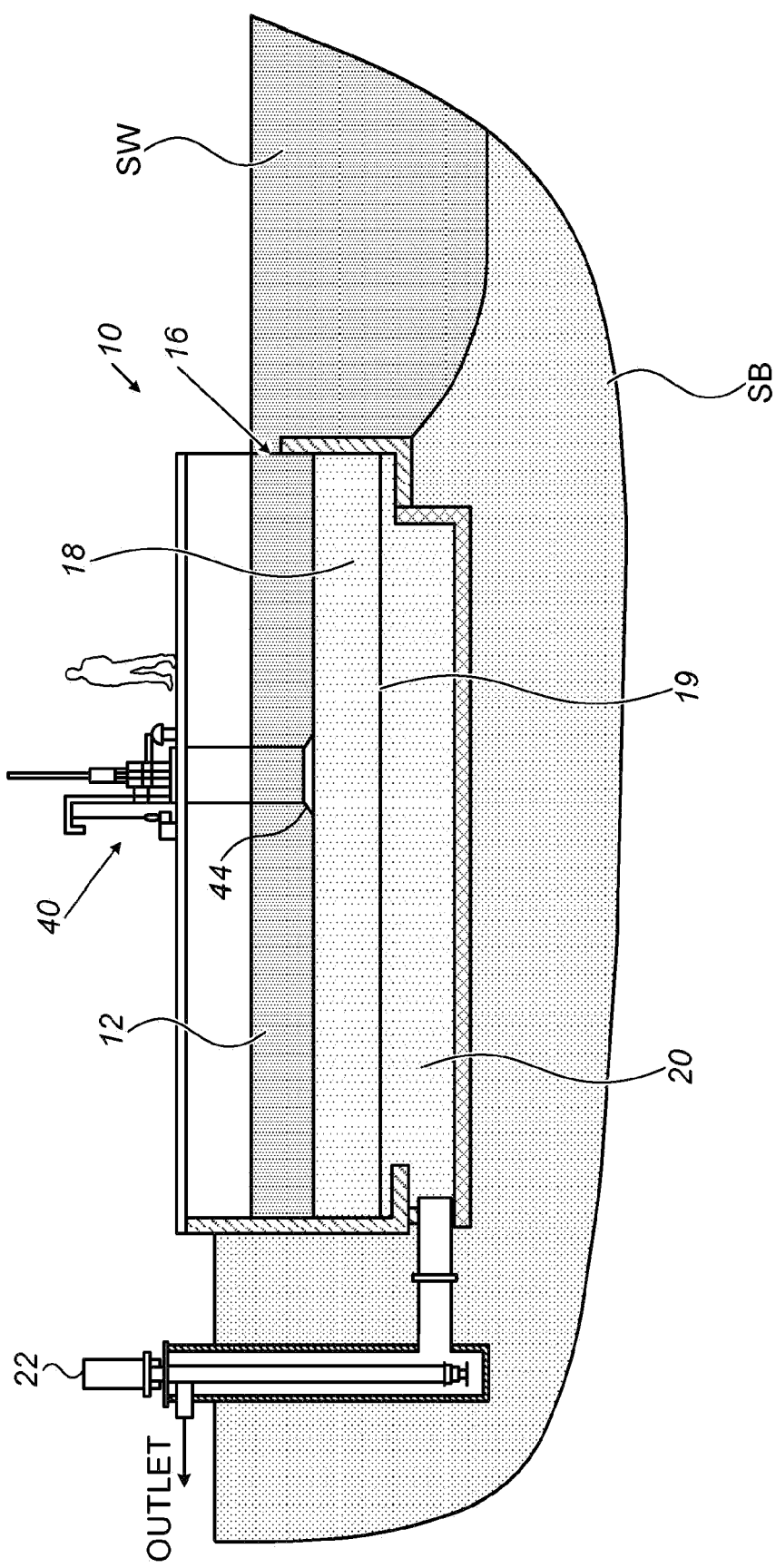
FIG. 1 illustrates a cross-sectional schematic diagram of a seawater intake and pretreatment system according to an embodiment of the invention.
Figure 2:
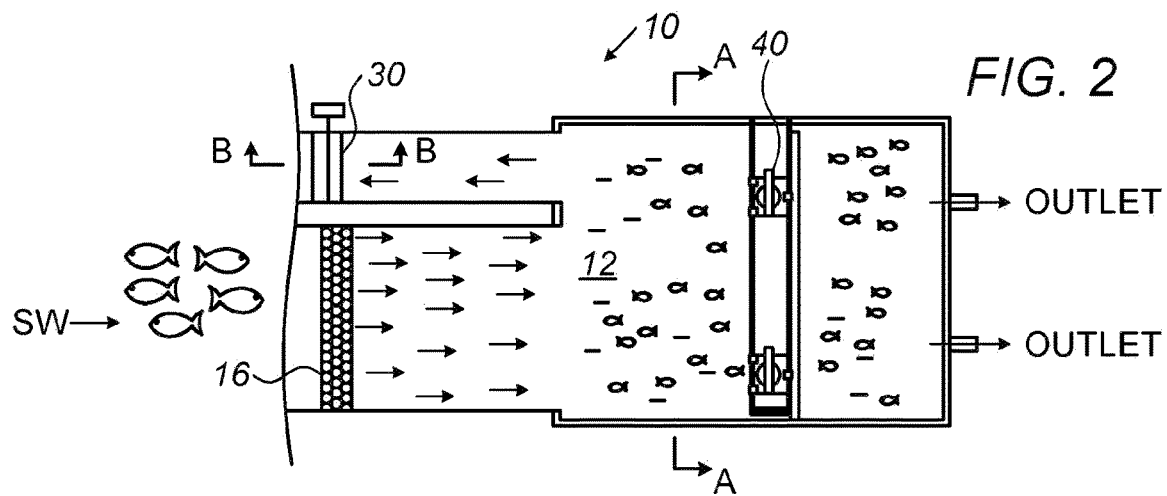
FIG. 2 is a top plan view of the intake area of the seawater and pretreatment system of an embodiment of the present invention.
Figure 3:
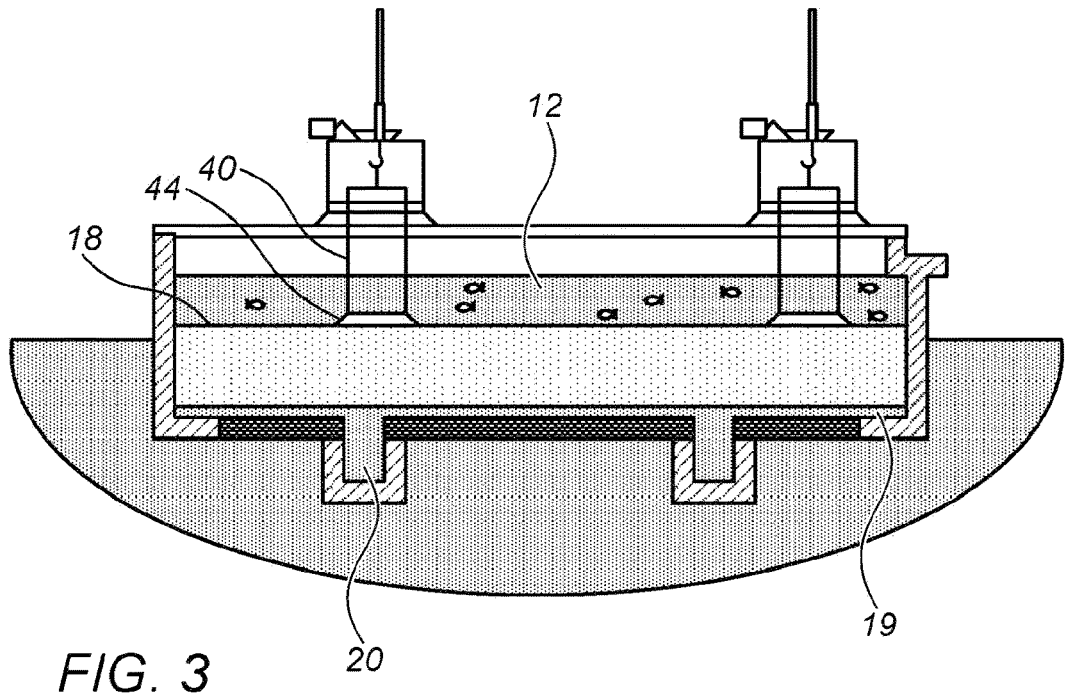
FIG. 3 is a cross-sectional view along lines A-A of FIG. 2.
Figure 4:
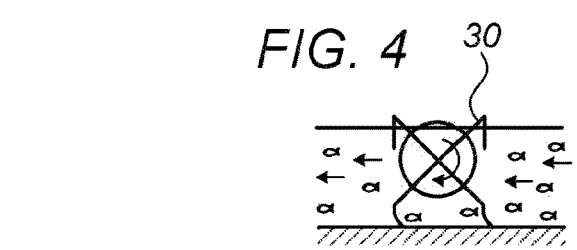
FIG. 4 is side view along lines B-B of FIG. 2.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways and is limited only by the appended claims. Also, it is to be understood that the phraseology and terminology employed herein is for the purpose of description and should not be regarded as limiting.

The intake system of the present invention provides conditions that serve to encourage larva growth (or around 1 mm in size) to finger size (around 5-10 cm) which is in contrast to prior art systems that are generally detrimental to larva and other aquatic life.

FIGS. 1 to 4 of the accompanying drawings illustrate a preferred embodiment of an environmentally friendly seawater intake system according to the invention. The intake system 10 is provided at a coastal area close to sea water and includes a seawater intake area 12 that receives seawater SW from the sea. A large net screen 16 is provided at the entrance of the intake area that serves to prevent the entry of large fishes (in excess of around 2 cm) into the intake area 12. The sea water flows by gravity through a granular media screen 18, such as via a sand filter supported on grating 19 and optionally a plastic filter such as GENPORE, for water and algae filtration and then passes to an outlet channel 20 comprising a drainage channel formed under the sand filter, where it is pumped by a vertical wet pit pump 22 for delivery to a process plant.

Additionally, the intake system 10 is provided with a rotating on-way gate 30 (see FIGS. 2 and 4) that allows seawater to flow out of the system. The gate also allows fish and other organisms to leave the intake area 12. A local backwashing apparatus or spot cleaner 40 is also provided to locally backwash portions of the filter media 18 to further clean the water. This is provided with a moving skirt 44 (see FIG. 3) that prevents entry of fish above a certain size (for example, greater than 1 cm) into the enclosure 50 of the apparatus.

In this manner, the intake and pretreatment unit of the present invention prevents larger fish from entering the area 12 and thus being harmed by the system. Additionally, the shallow waters (ideally less than 1 metre) formed above the filter media 18 encourages algae growth providing nutrition for larva growth. Larva (around 1 mm in size) do not pass through the filter media which generally filters particles of up to around 20 microns in size. Thus, the intake area acts as a nursery promoting larva growth and the vast majority of larva and small fishes are able to leave the intake area through the rotating gates 30 or other appropriate fish check valve that will allow the exit of fish. The area is protected from entry of large fish that would be predators of the small fish and larva, again promoting larva and small fish growth.

A small amount of the water in the intake area is subjected to local backwashing (see FIGS. 6 and 7 and further details below). The enclosure 50 for backwashing is provided with a moving skirt (not shown) that prevents entry of finger-sized fish (greater than 5 cm) and thus only very small fishes and larva may be subject to local backwashing for their removal along with other debris.

Figure 5:
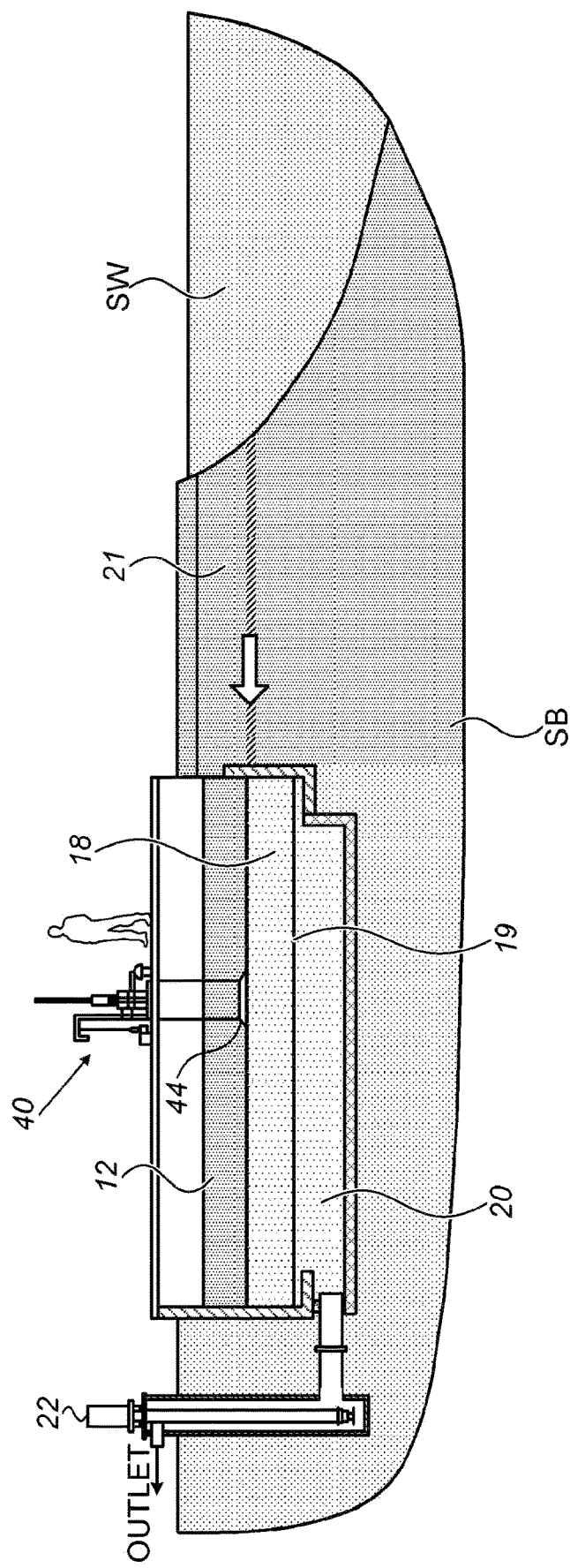
FIG. 5 illustrates schematically a seawater intake and pretreatment system according to another embodiment of the present invention.

FIG. 5 of the accompanying drawings illustrates an alternative eco-friendly intake system according to the present invention. Identical features already discussed in relation to FIGS. 1 to 4 are given the same reference numerals and only the differences will be discussed in detail. The sea water flows through a drainage channel 21 to the seawater intake area 12 (see arrow in FIG. 5). The flow is again driven by gravity through level difference with a net screen and rotating gate being provided to allow larva and small fish only to enter and leave the intake area.

Figure 6:
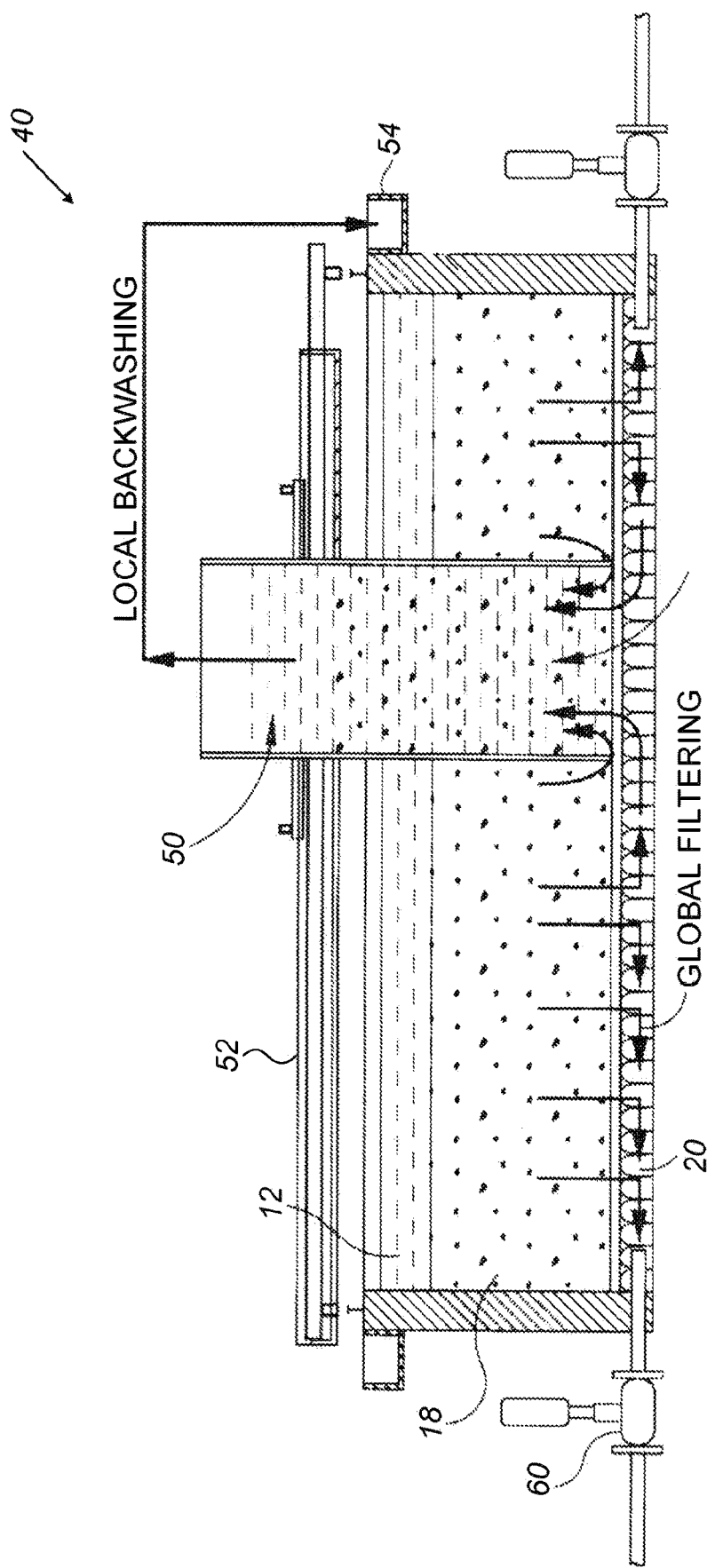
FIG. 6 is a schematic cross-sectional diagram of a local backwashing apparatus or spot cleaner for use in the intake and pretreatment system of the present invention.
Figure 7:
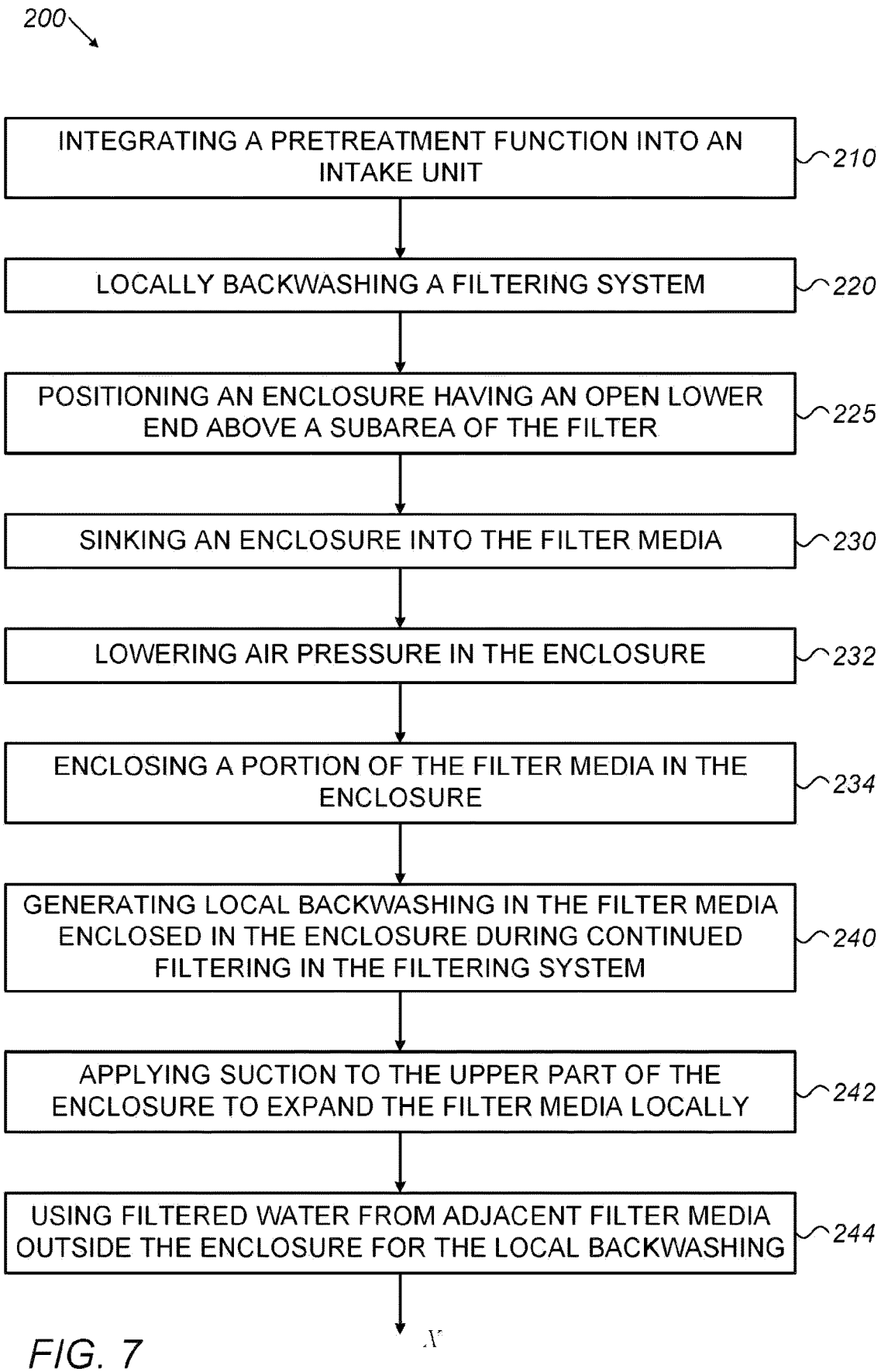
FIG. 7 is a flow diagram illustrating the steps involved in a local backwashing system utilized in the present invention.
Figure 7:
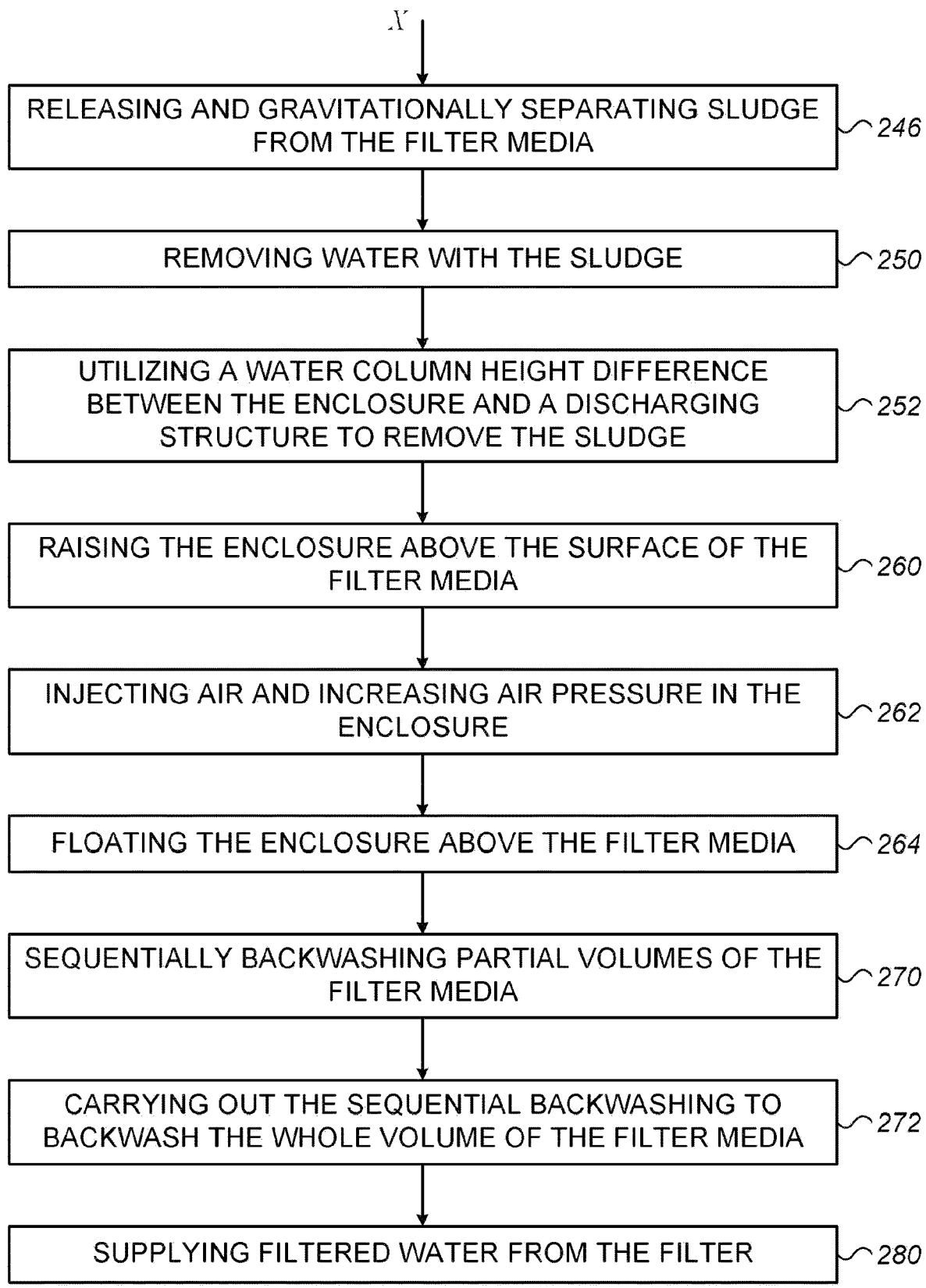

An Example of the local backwashing or spot cleaner apparatus 40 that is utilized in the present invention is shown in FIG. 6 of the accompanying drawings. Further details of this system are disclosed in WO2013/118031 of the Applicant. The apparatus performs local or spot backwashing of the water intake system by filtering some of the intake water 12 using a layer of filter media (e.g. sand filter 18 using sand). The apparatus is moved above the surface of the filter media and is inserted at different parts of it consecutively, to eventually backwash the whole volume of the filter media.

The apparatus comprises an enclosure 50 having a closed upper end that is supported on a bridge 52 or other support structure, such as a tower, a crane or a floating platform. The enclosure is sunk into the filter media 18 and encloses a portion of it. The enclosure is supported on the draining structure 20 at the base of the filter media. Sinking the enclosure is carried out by lowering the air pressure in its upper part.

Once sunk into the filter media, the lowered air pressure in the upper part of the enclosure is used to initiate suction in the enclosure that expands the enclosed portion of filter media and removes water with sludge from it. The water is supplied into the enclosure from filtered water entering the enclosure from the surrounding filter media outside the enclosure, as the filtration continues globally in the water treatment unit (through filter media outside the enclosure in the filtering system). The enclosure allows a local rise in the water level that does not produce a large head when viewed on the scale of the whole system, and hence does not require massive structural adaptations. Indeed, using local backwashing allows the water level above the filter media to be low, simplifying the construction of the whole system.

After water with sludge is removed, the enclosed portion of filter media is allowed to settle, and the enclosure is raised out of the filter media by increasing the air pressure in its upper part. Upon this increase, the enclosure floats and is moved to another area of the filter.

As a result, several benefits are achieved. The backwashing process uses a much smaller quantity of water, avoiding the use of large external reservoirs of both backwash water and sludge holding wastewater, and allows the continued operation of the filtering system during the local backwashing. Intake of water from the source is made possible without damage to the organisms living in the source, as the filtering system is gentle (no powerful suction but gentle flow through the filter media), and yet in an efficient manner that prevents clogging. The presence of a moving skirt at the base of the enclosure also prevents marine life up to a certain size from entering the enclosure, thereby further reducing harm to aquatic life.

The supporting structure 52 is configured to position enclosure 50 at a specified spot on the surface and a pneumatic system 60 is in fluid communication with an upper part of the enclosure 50 and configured to determine an air pressure in the upper part. A pipe system connects the upper part of enclosure 50 with pneumatic system 60 and with a discharge structure 54 for receiving wastewater with sludge generated in the local backwashing process. A control unit (not shown) is connected to supporting structure 52 and pneumatic system 16 and is configured to conduct local backwashing of consecutive partial volumes of filter media 18.

The control system conducts local backwashing of consecutive partial volumes of filter media 18 by the following stages. These stages are also illustrated in FIG. 7, being a schematic flowchart illustrating method 200 of supplying water treatment plant with water and backwashing of filtering system.

First, enclosure 50 is positioned at a specified spot on the surface that corresponds to the partial volume of filter media, i.e. over the spot that is to be backwashed (stage 225). The positioning may be carried out by lifting enclosure above the surface and then lowering it into the filter media, by dragging or rolling enclosure on the surface, or by any other positioning method. Then enclosure 50 is sunk into filter media 18 (stage 230) until a skirt of the enclosure is supported on drainage layer by reducing the air pressure in the upper part of enclosure (stage 232) through pneumatic system 60 once open lower end of enclosure is immersed in filter media to enclose the partial volume of filter media 18 within enclosure 50 (stage 234). At the beginning of the sinking process, lower end is in the filter media and partially filled with water, at the end of the sinking process, lower end is filled with a local portion of the filtering media. To initiate sinking stage, it is favorable that edge is within filter media, to prevent excessive water flow that may interfere with the process.

Local backwashing of the partial volume of filter media 18 enclosed in enclosure 50 is then generated during continued operation of global filtering in the filtering system (through filter media outside the enclosure in the filtering system) (stage 240), by generating suction through pneumatic system 60 (stage 242) that initiates a water flow from upper part of the enclosure through pipe system to discharge structure 54 (stage 250).

The water flow introduces into the enclosed partial volume of filter media filtered water from drainage layer that is filtered by the rest of the filter media, surrounding enclosure (stage 244) which expands the enclosed filter media and releases sludge therefrom (stage 246) to the water flow that flows to discharge structure (stage 250). Water flow is maintained by utilizing the height difference between the water level in enclosure 50 (that may locally be higher than the water level in filter) (stage 252). An edge of open lower end of enclosure 50 may be shaped to prevent filter media flow into enclosed partial volume. As edge is supported on an upper layer of drainage layer, good contact may be achieved e.g. by widening the edge. Furthermore, the form of edge may be designed to transmit forces (weight and contacting impact) from enclosure to upper layer in a non damaging manner. Local backwashing is carried out by water from drainage layer moving into the enclosed filter media, expanding it and removing sludge from the filter media particles. Hence, filtered water that is filtered during the local backwashing by other parts of the filter media outside the enclosure, is used for backwashing the enclosed filter media, without need for an external water source.

Expanded filter media fills most of the volume of enclosure 50, and is agitated due to the suction, water flow into the enclosure and water flow out of the enclosure. The agitation separates the sludge particles gravitationally from the filter media, as sludge particles float in the water and filter media sinks. The portion of backwashed filter media may be allowed to settle before enclosure is removed, in order to prevent horizontal mixing of filter media 18 which may decrease the efficiency of the local backwashing.

Finally, enclosure 50 is raised above the surface of filter media 18 (stage 260) to release the backwashed enclosed volume of filter media, by injecting air and increasing air pressure in the upper part of enclosure (stage 262) through the pneumatic system to float enclosure 50 above filter media 18 (stage 264). Settled backwashed filter media starts filtering water at high efficiency once enclosure 50 is removed.

Integrated intake and pretreatment unit 10 of the present invention prevents damage to the natural fauna in the body of water from where water is taken. As the intake is carried out through the filter media, there are no open pipes or intake screens that damage organisms such as fish, and no open fast flowing water bodies that may remove and kill organisms. Furthermore, the shallow waters above the filter media 18 are a breeding ground for algae promoting larvae growth. These waters are protected by screens to prevent access by larger predatory fish thereby further serving to enhance larvae growth. This also promotes growth of small fishes that are able to leave the shallow waters by the rotating one-way gate. A small amount of larva may be taken up by the local backwashing apparatus but small fishes are prevented from entering the unit due to the presence of a moving skirt. Thus, the method and system of the present invention serves to greatly enhance marine life at an intake and pretreatment unit.

In the above description, an embodiment is an example or implementation of the invention. The various appearances of "one embodiment", "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Embodiments of the invention may include features from different embodiments disclosed above, and embodiments may incorporate elements from other embodiments disclosed above. The disclosure of elements of the invention in the context of a specific embodiment is not to be taken as limiting their used in the specific embodiment alone.

Furthermore, it is to be understood that the invention can be carried out or practiced in various ways and that the invention can be implemented in embodiments other than the ones outlined in the description above.

The invention is not limited to those diagrams or to the corresponding descriptions. For example, flow need not move through each illustrated box or state, or in exactly the same order as illustrated and described.

Meanings of technical and scientific terms used herein are to be commonly understood as by one of ordinary skill in the art to which the invention belongs, unless otherwise defined.

While the invention has been described with respect to a limited number of embodiments, these should not be construed as limitations on the scope of the invention, but rather as exemplifications of some of the preferred embodiments. Other possible variations, modifications and applications are also within the scope of the invention, as limited by the claims.

We claim:

1. A method for water intake and pretreatment comprising:
    delivering water from a natural body of water to a reservoir having a granular filter media bed;
    preventing entry of organisms above a predetermined size from entering the reservoir;
    allowing organisms below the predetermined size which have entered the reservoir, to exit the reservoir;
    filtering the water delivered to the reservoir by passing it through the granular filter media bed, thereby producing filtered water; and
    removing the filtered water from the reservoir.

2. The method of claim 1, further comprising: local backwashing of partial volumes of the granular filter media bed.

3. The method of claim 1, further comprising: rinsing the reservoir.

* * * * *